(12) United States Patent
Khatri et al.

(10) Patent No.: US 7,945,815 B2
(45) Date of Patent: May 17, 2011

(54) SYSTEM AND METHOD FOR MANAGING MEMORY ERRORS IN AN INFORMATION HANDLING SYSTEM

(75) Inventors: Mukund P. Khatri, Austin, TX (US); Paul D. Stultz, Cedar Park, TX (US); Forrest E. Norrod, Austin, TX (US); Jimmy D. Pike, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 469 days.

(21) Appl. No.: 11/838,602

(22) Filed: Aug. 14, 2007

(65) Prior Publication Data

US 2009/0049335 A1    Feb. 19, 2009

(51) Int. Cl.
*G06F 11/00* (2006.01)
(52) U.S. Cl. .......................................... 714/42; 714/36
(58) Field of Classification Search .................... 714/42, 714/5
See application file for complete search history.

(56) References Cited

U.S. PATENT DOCUMENTS

| | | | |
|---|---|---|---|
| 4,209,846 A | 6/1980 | Seppa | |
| 4,240,143 A | 12/1980 | Besemer et al. | |
| 4,426,688 A | 1/1984 | Moxley | |
| 4,479,214 A | 10/1984 | Ryan | |
| 5,450,576 A * | 9/1995 | Kennedy | 713/2 |
| 5,539,697 A | 7/1996 | Kim et al. | |
| 5,588,112 A | 12/1996 | Dearth et al. | |
| 5,666,482 A * | 9/1997 | McClure | 714/8 |
| 5,671,229 A | 9/1997 | Harari et al. | |
| 5,751,641 A | 5/1998 | Petrosino | |
| 5,758,056 A * | 5/1998 | Barr | 714/7 |
| 5,764,878 A | 6/1998 | Kablanian et al. | |
| 5,774,647 A | 6/1998 | Raynham et al. | |
| 5,862,314 A | 1/1999 | Jeddeloh | |
| 5,867,702 A * | 2/1999 | Lee | 713/1 |
| 5,905,858 A | 5/1999 | Jeddeloh | |
| 5,986,950 A | 11/1999 | Joseph | |
| 5,996,096 A | 11/1999 | Dell et al. | |
| 6,035,432 A | 3/2000 | Jeddeloh | |
| 6,052,798 A | 4/2000 | Jeddeloh | |
| 6,125,392 A | 9/2000 | Labatte et al. | |
| 6,154,851 A | 11/2000 | Sher et al. | |
| 6,158,025 A | 12/2000 | Brisse et al. | |
| 6,173,382 B1 | 1/2001 | Dell et al. | |
| 6,237,110 B1 * | 5/2001 | Lin et al. | 714/7 |

(Continued)

FOREIGN PATENT DOCUMENTS

EP      0704854 A1    4/1996

(Continued)

OTHER PUBLICATIONS

USPTO Non-Final Rejection for U.S. Appl. No. 11/838,593, dated Nov. 4, 2009.

(Continued)

*Primary Examiner* — Bryce P Bonzo
(74) *Attorney, Agent, or Firm* — Baker Botts L.L.P.

(57) ABSTRACT

A method for handling memory defects during the POST phase and memory calibration in single processor and multi-processor information handling systems is disclosed whereby information regarding the location of a known memory defect is utilized to optimize the performance of an information handling system. Memory defects within system memory are identified and replaced during operation with error free memory space.

20 Claims, 5 Drawing Sheets

U.S. PATENT DOCUMENTS

| | | | |
|---|---|---|---|
| 6,260,127 B1 | 7/2001 | Olarig et al. | |
| 6,285,607 B1 | 9/2001 | Sinclair | |
| 6,304,989 B1 | 10/2001 | Kraus et al. | |
| 6,324,657 B1 | 11/2001 | Fister et al. | |
| 6,460,152 B1 | 10/2002 | Demidov et al. | |
| 6,499,117 B1 | 12/2002 | Tanaka | |
| 6,499,120 B1 | 12/2002 | Sommer | |
| 6,536,005 B1 | 3/2003 | Augarten | |
| 6,600,614 B2 | 7/2003 | Lenny et al. | |
| 6,601,183 B1 | 7/2003 | Larson et al. | |
| 6,622,269 B1 | 9/2003 | Ngo et al. | |
| 6,728,907 B1* | 4/2004 | Wang et al. | 714/47 |
| 6,820,224 B1 | 11/2004 | Lin et al. | |
| 6,889,305 B2 | 5/2005 | Adelmann | |
| 7,065,630 B1 | 6/2006 | Ledebohm et al. | |
| 7,114,024 B2 | 9/2006 | Herbst | |
| 7,120,777 B2 | 10/2006 | Adelmann | |
| 7,123,051 B1* | 10/2006 | Lee et al. | 326/40 |
| 7,246,269 B1* | 7/2007 | Hamilton | 714/42 |
| 7,251,744 B1* | 7/2007 | Housty | 714/7 |
| 7,269,765 B1 | 9/2007 | Charlton et al. | |
| 7,272,758 B2 | 9/2007 | Roohparvar | |
| 7,444,564 B2 | 10/2008 | Anand et al. | |
| 7,447,955 B2 | 11/2008 | Niijima et al. | |
| 7,590,008 B1* | 9/2009 | Roge et al. | 365/189.011 |
| 7,603,595 B2 | 10/2009 | Sasaki | |
| 2001/0042225 A1 | 11/2001 | Cepulis et al. | |
| 2002/0073353 A1 | 6/2002 | Fish et al. | |
| 2002/0108072 A1 | 8/2002 | Sim et al. | |
| 2002/0120826 A1 | 8/2002 | Venkatraman et al. | |
| 2002/0157048 A1 | 10/2002 | Roohparvar | |
| 2002/0184445 A1 | 12/2002 | Cherabuddi | |
| 2003/0005367 A1 | 1/2003 | Lam | |
| 2003/0058711 A1 | 3/2003 | Benedix et al. | |
| 2003/0095455 A1 | 5/2003 | Dono et al. | |
| 2003/0145250 A1 | 7/2003 | Chin | |
| 2003/0208654 A1 | 11/2003 | Krontz et al. | |
| 2004/0034825 A1 | 2/2004 | Jeddeloh | |
| 2004/0042293 A1 | 3/2004 | Ogino | |
| 2004/0088614 A1 | 5/2004 | Wu | |
| 2005/0060514 A1* | 3/2005 | Pomaranski et al. | 711/202 |
| 2006/0004942 A1* | 1/2006 | Hetherington et al. | 711/3 |
| 2006/0059383 A1 | 3/2006 | Roohparvar | |
| 2006/0236165 A1* | 10/2006 | Cepulis et al. | 714/721 |
| 2007/0061637 A1 | 3/2007 | Ward et al. | |
| 2007/0101238 A1* | 5/2007 | Resnick et al. | 714/763 |
| 2007/0136385 A1* | 6/2007 | Abrashkevich et al. | 707/200 |
| 2007/0174718 A1* | 7/2007 | Fouquet-Lapar | 714/42 |
| 2007/0217559 A1* | 9/2007 | Stott et al. | 375/355 |
| 2007/0260828 A1* | 11/2007 | Swaminathan et al. | 711/154 |
| 2008/0229143 A1 | 9/2008 | Muraki | |
| 2008/0235505 A1* | 9/2008 | Hobson et al. | 713/100 |
| 2008/0301530 A1* | 12/2008 | Spanel et al. | 714/765 |
| 2009/0254777 A1* | 10/2009 | Feyt et al. | 714/37 |
| 2009/0300413 A1* | 12/2009 | Chang et al. | 714/8 |

FOREIGN PATENT DOCUMENTS

| | | |
|---|---|---|
| JP | 2005-234744 A | 9/2005 |
| WO | WO98/02816 | 1/1998 |
| WO | 9905599 A1 | 2/1999 |
| WO | WO99/05599 | 4/1999 |
| WO | 9950748 A1 | 10/1999 |

OTHER PUBLICATIONS

USPTO Non-Final Rejection for U.S. Appl. No. 11/838,585, dated Nov. 19, 2009.

USPTO Final Rejection for U.S. Appl. No. 11/838,687, dated May 6, 2009.

USPTO Non-Final Rejection for U.S. Appl. No. 11/838,687, dated Mar. 10, 2009.

Supplementary European Search Report for EP 08 01 4498, dated Mar. 2, 2009.

Supplementary European Search Report for EP 08 01 4500, dated Mar. 2, 2009.

Singapore Office Action for Application No. 200805816-6, dated Mar. 30, 2009.

International Search Report and Written Opinion for Singapore Patent Application No. 200805821-6, dated May 4, 2009.

International Search Report and Written Opinion for Singapore Patent Application No. 200805817-4, dated May 28, 2009.

Partial European Search Report for EP 08 014 502.2, dated Aug. 11, 2009.

USPTO Non-Final Rejection for U.S. Appl. No. 11/838,593 dated Jun. 8, 2010.

USPTO Final Rejection for U.S. Appl. No. 11/838,585 dated Apr. 26, 2010.

* cited by examiner

SYSTEM AND METHOD FOR MANAGING MEMORY ERRORS IN AN INFORMATION HANDLING SYSTEM

TECHNICAL FIELD

The present disclosure relates generally to the field of computer systems and information handling systems, and, more particularly, to handling memory errors.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

A computing system will typically include some form of temporary information storage medium, such as random access memory. In come computing systems, the amount of memory included in the information handling system may be on the order of gigabytes. As memory size increases, the likelihood that part of the memory will either be manufactured defective or become defective over time increases dramatically. If left unmanaged, the presence of defective memory cells, regardless of their size, can cause the information handling system to fail, which can initiate an abrupt end to the current operation of the information handling system, resulting in the loss of critical data, or can prevent the information handling system from starting up altogether.

As computing systems continue to evolve and computer technology advances, the operational relationship between the CPU and memory becomes more significant. Many attributes of modem systems (specifically the introduction of multi-core processors and virtualization in general) are forcing an ever-growing memory footprint. Consequently, not only is system memory growing to be a much more substantial percentage of the overall solution cost, but the impact of erroneous behavior in the memory can have a much more adverse effect on the life cycle expenses associated with the computing system.

Traditionally, embedded error correction schemes have successfully been used to avoid "crashes" on a single bit error and to detect multi-bit corruptions. However, as memory geometries become smaller and memory size grows larger, it is necessary to add another level of service protection that is quickly available and resident on the memory module itself.

The successful operation of the system in a PC architecture depends on certain memory areas not being defective. For example, even in an advanced server system that includes 128 GB of memory, it is critical that certain memory regions such as the interrupt vector locations, Basic Input/Output Systems ("BIOS") data area, and the 64 KB region at F000:0 address space contain no defects.

There are a variety of methods that may be employed to track or otherwise indicate the presence of a known memory error. As a result, in instances where the presence and condition of a defective or damaged memory block is known, it becomes imperative that early BIOS Power-On Self Test ("POST") processes be made capable of tolerating memory defects. Specifically, it is desirable to allow the POST processes to successfully complete the POST initialization process without crashing, despite the existence of the known memory defects.

SUMMARY

In accordance with the present disclosure a method for handling memory defects during the POST phase and memory calibration in single processor and multiprocessor information handling systems is disclosed whereby information regarding the location of a known memory defect is utilized to optimize the performance of an information handling system.

A technical advantage of the present invention is that it can significantly reduce the cost of an information handling system by allowing the use of memory components with known memory defects without jeopardizing the system performance. The capability to recognize and store memory defect information allows an information handling system with a partially defective memory component to operate without "crashing." Specifically, the information handling system remains operable as it bypasses the defective memory locations and updates its memory defect information as new defects arise. The importance of this improvement is magnified as the system memory is growing to represent a substantial portion of the overall solution cost.

Another technical advantage of the present invention is that it allows the system to maintain normal operations despite minor deficiencies in the system memory. By minimizing the impact of erroneous memory behavior a system and method in accordance with the present invention can significantly reduce the life cycle expenses associated with an information handling system. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a person computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
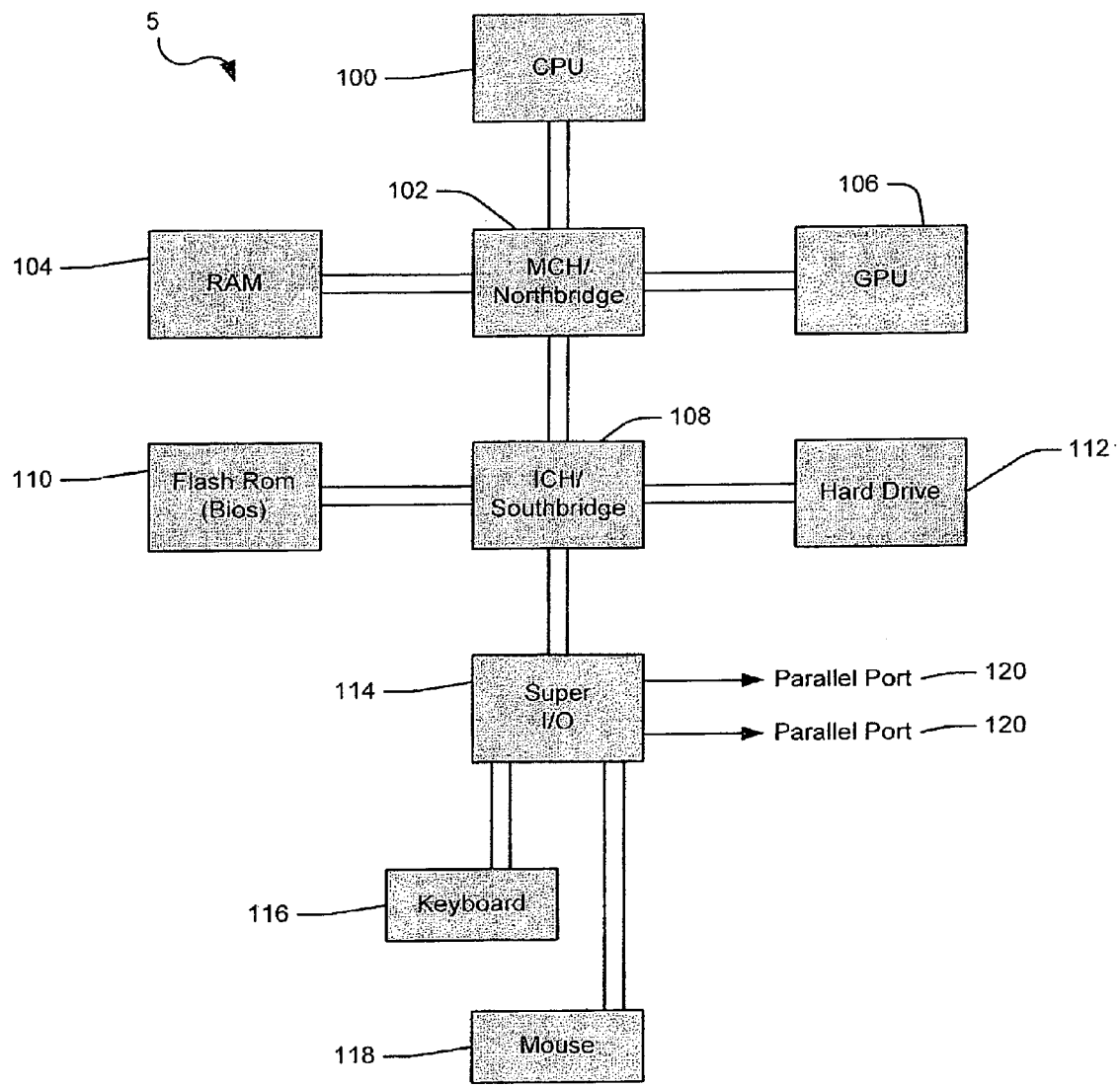
FIG. 1 is a block diagram of a traditional information handling system.

Shown in FIG. 1 is a block diagram of a typical information handling system. A processor or CPU 100 of the typical information handling system 5 is communicatively coupled to a memory controller hub or north bridge 102. Memory controller hub 102 is coupled to memory 104 and a graphics processing unit 106. Memory controller hub 102 is also coupled to an I/O controller hub or south bridge 108. I/O hub 108 is coupled to storage elements of the computer system, including a storage element 110 such as flash ROM for the BIOS of the computer system and the hard drive 112 of the computer system. I/O hub 108 may also be coupled to a Super I/O chip 114, which is itself coupled to many of the I/O ports of the computer system, including keyboard 116, mouse 118, and parallel ports 120.

Figure 2:
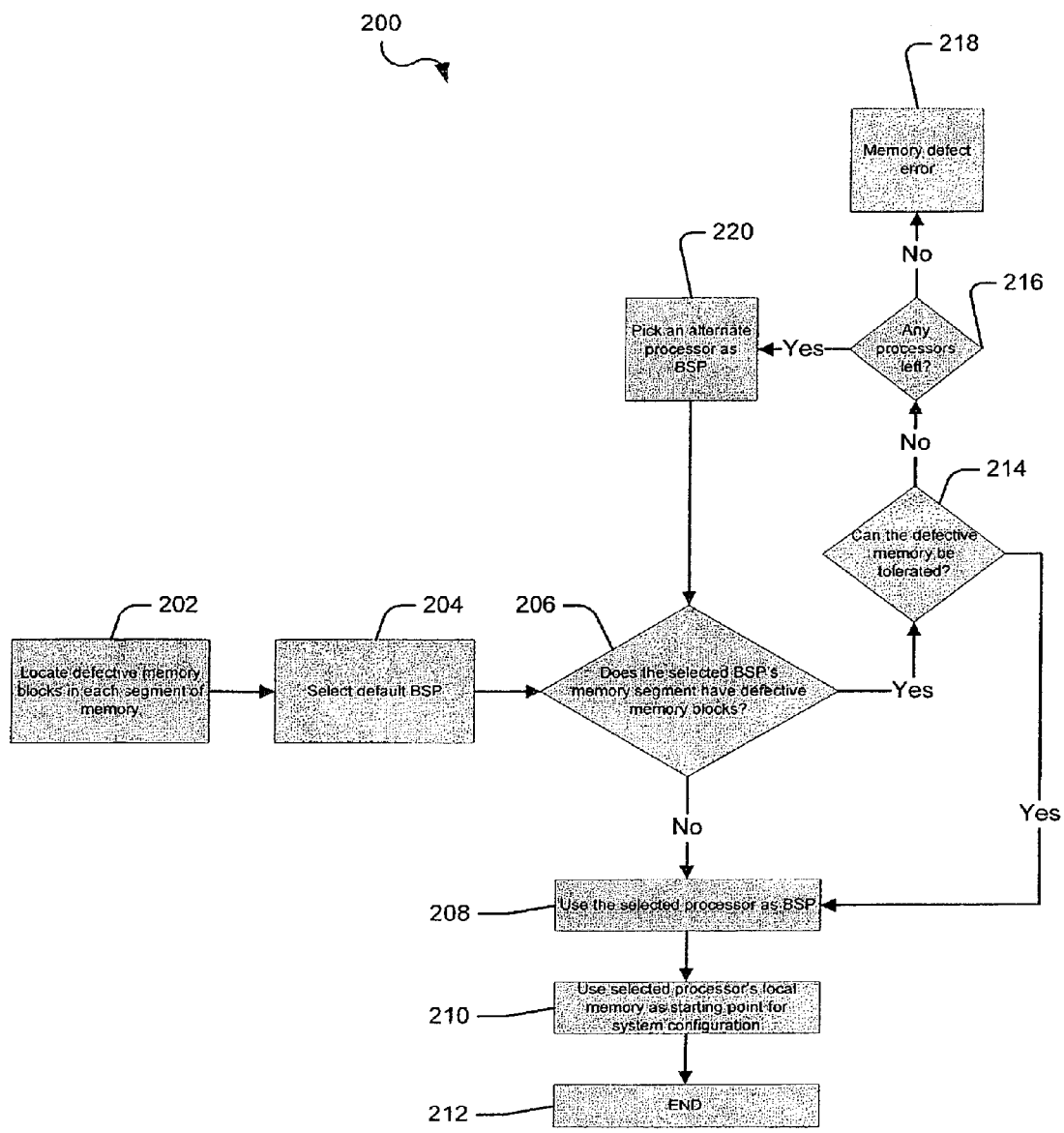
FIG. 2 is a flow diagram of the steps for handling memory defects in servers with Non-Uniform Memory Access architecture.

In FIG. 2, a flow diagram of the steps for handling memory defects in servers with Non-Uniform Memory Access (NUMA) architecture is denoted by reference numeral 200. In a NUMA system, each processor has its locally mapped memory. In addition, each processor can also access the memory attached to other processors which is mapped on the processor as remote memory. Typically, one of the processors in the NUMA architecture is designated as the default boot service processor. The designation of the default boot service processor may be made as part of the hardware configuration of the system or may be selected or modified through software functionality. The BIOS will initially run from the default boot service processor.

At step 202, during the POST process, the BIOS looks for and locates defective memory blocks on each of the segments of the memory. Next, at step 204, the default boot service processor is selected as the processor whose memory is to be analyzed for memory defects. At step 206, it is determined whether the default boot service processor's memory segment has any defective memory blocks. If not, at step 208, the default boot service processor will remain the boot service processor and at step 210, its local memory will be used as the starting point for a system configuration algorithm. The process will then terminate at step 212.

If the default boot service processor's memory segment has defective memory blocks, then at step 214 it is determined whether the defective memory can be tolerated by the system. In one embodiment, the tolerance determination depends on whether the existence of defective memory in the particular address ranges is acceptable or optimal to the system's behavior and performance. A number of different factors may be considered when determining whether a particular defective memory address will have intolerable impact on the system. In one embodiment, factors such as the type of memory, size of memory, speed of memory, and the total amount of memory configured on a node may be considered to determine if the memory defect can be tolerated. If the memory defect is minor and can be tolerated by the system, then the default boot service processor will remain the boot service processor and at step 210, its local memory will be used as the starting point for the system configuration algorithm. The process will then terminate at step 212.

If the memory defect is such that the system would not perform optimally or at a pre-specified minimum level, then, at step 216, it is determined whether there are other processors in the multiprocessor system that have yet to be analyzed. If there are no processors remaining, the process terminates at step 218 and a memory defect error is detected and announced in the system. In contrast, if there are other processors in the system that have not yet been analyzed, another processor will be selected as the boot service processor at step 220 and the above process will be repeated for the newly selected boot service processor. This process continues until an acceptable processor is located or there are no other processors remaining to be analyzed.

As a result, if the default boot service processor's memory segment has defective blocks in the address ranges that are not acceptable or optimal to the system's behavior, performance, or operating system, then the BIOS will select an alternate processor as the boot service processor. The selection of an alternate processor as the boot service processor can be made through any of several suitable algorithms for the selection of an alternate boot service processor. This process continues until a boot service processor with no memory defect or an acceptable level of memory defect is selected or a memory defect error signal is generated.

As would be appreciated by those of ordinary skill in the art, with the benefit of this disclosure, the determination of the defective blocks may include both the predefined defective blocks stored in nonvolatile RAM or identified through POST-time memory tests. Although the flow diagram of FIG. 2 refers to a NUMA architecture, as would be appreciated by those of ordinary skill in the art, with the benefit of this disclosure, the same method may be utilized in other multiprocessor systems such as a multicore central processing unit. For example, in a multicore CPU system, instead of picking an alternate boot service processor, the system would select a processor core from an alternate CPU socket.

Figure 3:
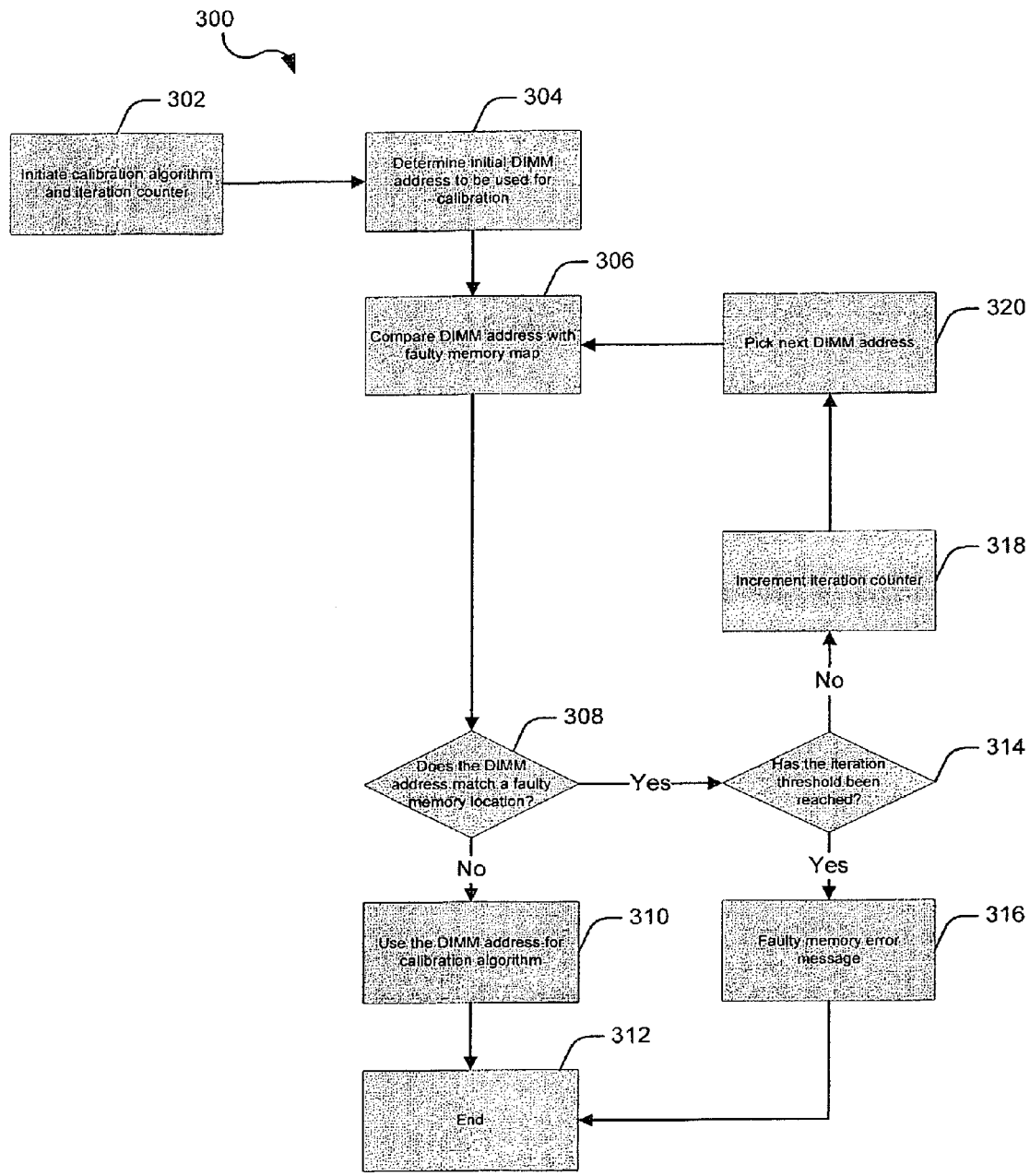
FIG. 3 is a flow diagram of the steps for handling memory defects when calibrating a Dual In-line Memory Module.

A method for minimizing the impact of memory defects on the system is shown at 300 in FIG. 3. FIG. 3 depicts a flow diagram for a method to handle known memory defects during calibration of a Dual In-line Memory Module's (DIMM) parameters such as the Distributed Queuing System (DQS) delay and Receive-Enable calibrations.

The ability to handle memory defects when calibrating DIMM parameters is significant. For example, in a Double Data Rate 2 (DDR2) or Fully Buffered DIMM (FBD) memory based design, the calibration procedure's algorithm involves write/read operations to specific offsets within any given memory DIMM. The importance of dealing with memory defects at the calibration stage is magnified by the fact that, even in instances in which the memory is an Error Correction Code (ECC) memory, the ECC functionality is not enabled prior to the calibration process. Moreover, the result would be the same regardless of whether the memory error is a single bit or multi-bit error because the ECC functionality is not enabled at the calibration stage. Consequently, a hard memory error resulting from a memory defect in the DIMM at the particular DIMM address used for calibration will result in a calibration failure.

Figure 4:
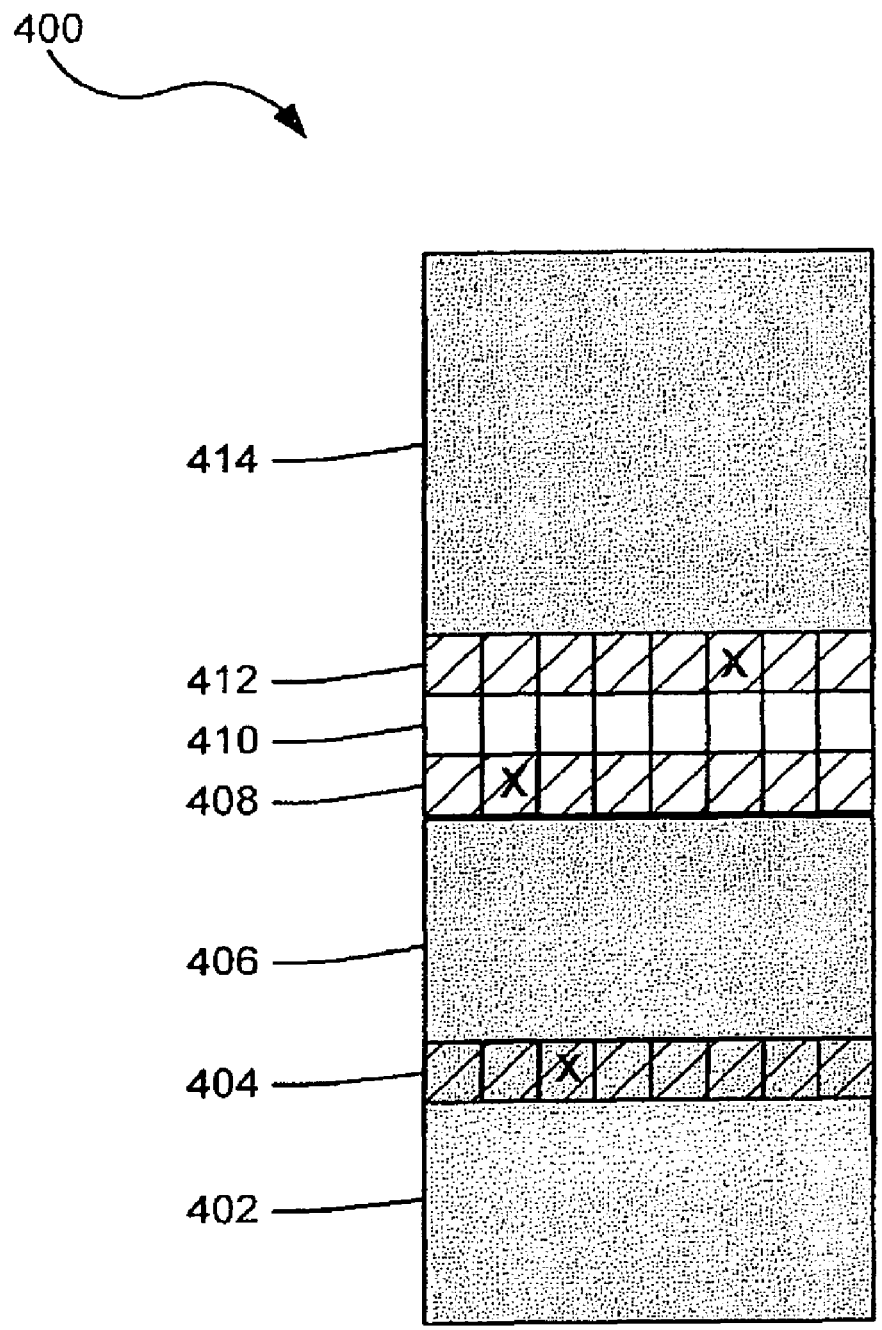
FIG. 4 is a flow diagram of an exemplary memory module with defective regions.

At step 302, the calibration algorithm initiates, and the iteration counter of the algorithm is set to 1. At step 304, the initial DIMM address to be used for calibration is determined. At step 306, the initial DIMM address is compared with the defects indicated in a faulty memory map. A memory space is depicted in FIG. 4 and denoted generally with reference numeral 400. The memory map indicates that certain parts of the memory 404, 408, 412 contain memory defects. Returning now to FIG. 3, at step 308, it is determined whether the initial DIMM address matches one of the faulty memory locations.

If the initial DIMM address does not match a faulty memory location, that address is used by the calibration algorithm to calibrate the DIMM at step 310 and the process terminates at step 312. If the initial DIMM address does match one of the known memory defect locations as indicated by the faulty memory map, at step 314 it is determined whether the iteration threshold has been reached. The iteration threshold is a predetermined number which represents the number of iterations that are to be carried out to find an initial DIMM address that does not match a memory defect. If the threshold number of iterations has been reached, a faulty memory error message is issued at step 316 indicating that the calibration process was unsuccessful. The process then terminates at step 312.

If the iteration threshold has not been reached, then the iteration counter is incremented at step 318. Next, at step 320, a new address offset within the DIMM will be selected as the DIMM address to be used for calibration. The offset to be used is a predetermined factor. In one embodiment, the offset may be a subsequent cache line offset or a page offset. The offset address will point to a new DIMM memory location, which will again be examined at step 306 to determine if it contains any memory defects. This process is repeated until either the iteration threshold is reached, or an error free DIMM location has been identified for use in the calibration process.

Figure 5:
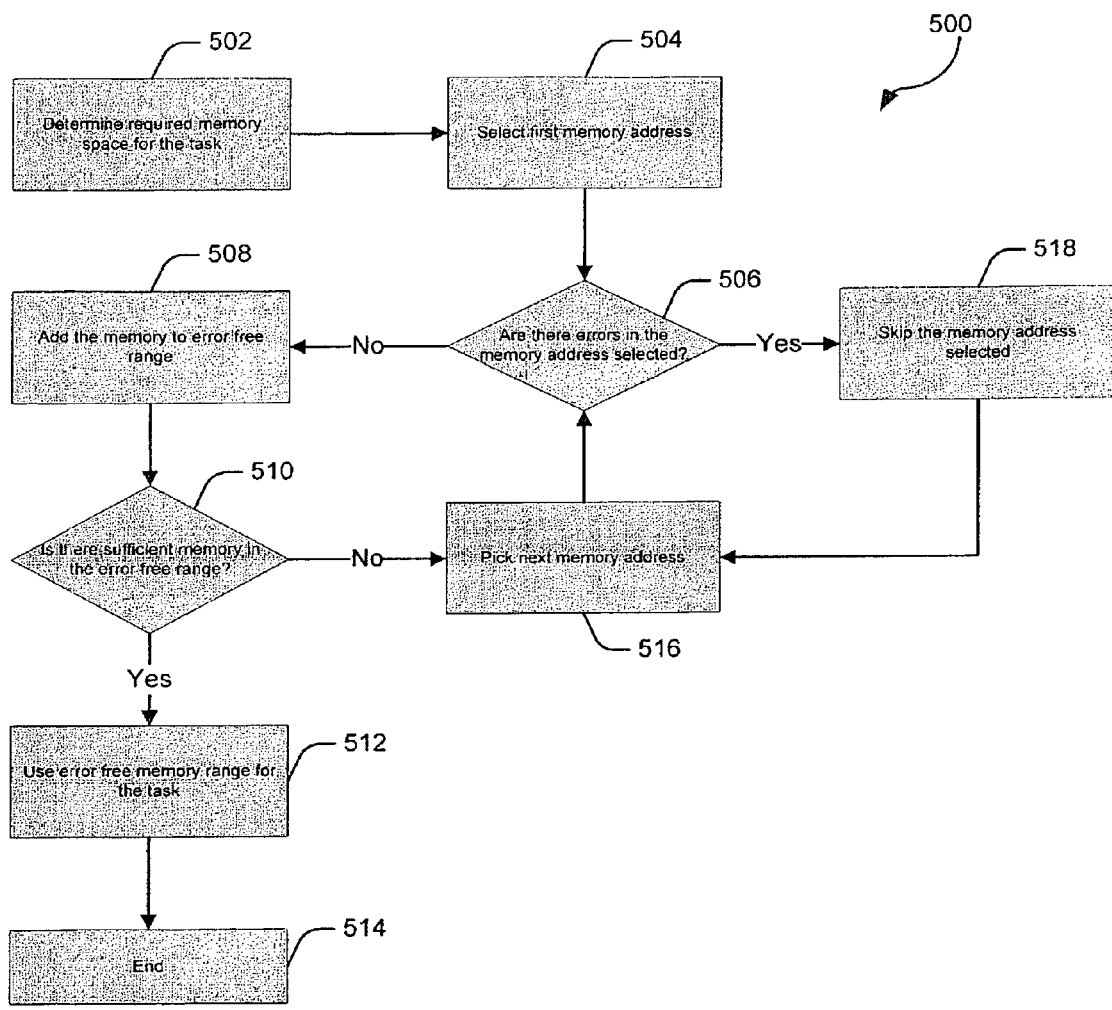
FIG. 5 is a flow diagram of steps for handling memory defects when allocating memory for use by the POST tasks.

Another method for minimizing the impact of memory defects on the system is depicted in the flow diagram of FIG. 5 and denoted generally by reference numeral 500. Specifically, the flow diagram of FIG. 5 depicts a method for dealing with memory defects when allocating memory for use by the POST task, whether for code or data storage. The allocation of memory for use by POST task includes, for example, allocation of CPU physical addresses located below the four gigabyte memory address range where Advanced Configuration and Power Interface (ACPI) tables, System Management BIOS (SMBIOS) tables and Universal Serial Bus (USB) data structures are located. In one embodiment the method of FIG. 5 may be carried out by the BIOS or the Firmware.

At step 502, the required amount of memory space for the particular POST task is determined. Next, at step 504, the first memory address in the desirable memory space for the particular task is selected. At step 506, it is determined whether the memory location corresponding to the selected memory address contains any errors or defects. If not, then memory space corresponding to the analyzed memory address is added to the error free memory range in step 508. At step 510 the system will decide whether a sufficient amount of error free memory space has been set aside for the particular POST task. If yes, then the error free memory range is used for the task at 512 and the process terminates at 514. If a sufficient amount of error free memory has not been set aside for the particular POST task, then the next memory address in the desired memory range is selected at step 516 and the process returns to step 506 to determine if the newly selected memory space contains any defects or errors. If at step 506 it is determined that the memory locations corresponding to a selected memory address do contain errors or defects, then that memory space is skipped at step 518 and a subsequent memory space is selected at step 516. As would be appreciated by those of ordinary skill in the art, with the benefit of this disclosure, the amount of memory space skipped and the offset for the next memory location selected are pre-specified.

A better understanding of the process of FIG. 5 may be obtained by returning to FIG. 4. The memory space 400 has several parts numbered 402 through 414. The process of FIG. 5 will go through the memory addresses corresponding to the memory locations in the memory space 400 and locate the memory locations 404, 408, 412 containing a memory error or defect. These memory locations containing the memory errors or defects are then skipped and the POST task is performed under the assumption that the memory space 400 comprises of one continuous, error free memory section which consists of regions 402, 406, 410 and 414. As would be appreciated by those of ordinary skill in the art, with the benefit of this disclosure, the amount of memory skipped once an error is detected may vary depending on the application and is not limited to the exemplary embodiment depicted in FIG. 4.

As would be appreciated by those of ordinary skill in the art, with the benefit of this disclosure, the implementation of the methods disclosed with reference to FIGS. 3 and 5 is not limited to multiprocessor systems. These methods may be used in a variety of information handling systems to minimize the impact of memory errors. Although the present disclosure has been described in detail, it should be understood that various changes, substitutions, and alterations can be made hereto without departing from the spirit and the scope of the invention as defined by the appended claims.

What is claimed is:

1. A method of handling memory errors in a multiprocessor system, comprising:
   locating a defective memory block in a memory segment, wherein each memory segment corresponds to a processor;
   selecting the processor corresponding to the memory segment with a predetermined acceptable level of defective memory blocks; and
   designating the selected processor as a boot service processor.

2. The method of claim 1, further comprising designating the memory segment corresponding to the selected processor as a starting point for system memory configuration.

3. The method of claim 1, wherein the multiprocessor system comprises a Non-Uniform Memory Access system.

4. The method of claim 1, wherein the multiprocessor system comprises a multicore central processing unit system.

5. The method of claim 1, wherein a Basic Input/Output system locates the defective memory block in the memory segment.

6. The method of claim 1, wherein location of the defective memory block is stored in a Non-Volatile Random Access Memory.

7. The method of claim 1, wherein location of the defective memory block is determined by a Power On Self Test time memory test.

8. The method of claim 1, wherein the memory segment corresponding to the processor is the processor's local memory.

9. A method for handling memory defects in a Dual In-line Memory Module calibration, comprising:
   determining an initial address to be used for calibration;
   comparing a memory location corresponding to the initial address with a faulty memory map; and
   offsetting the initial address if the memory location corresponding to the initial address is included in the faulty memory map.

10. The method of claim 9, further comprising:
   initiating a threshold counter;
   specifying an iteration threshold;
   incrementing the iteration counter after offsetting the initial address; and
   issuing an error massage if the iteration counter equals the iteration threshold.

11. The method of claim 9, wherein offsetting the initial address comprises using a subsequent cache line offset.

12. The method of claim 9, wherein offsetting the initial address comprises using a subsequent page line offset.

13. The method of claim 9, wherein the Dual In-line Memory Module calibration comprises a Receive Enable calibration.

14. A method for handling a memory defect in a Power-On Self Test memory allocation, comprising:
   determining an amount of space required for a task;
   analyzing a memory space requested by the task, wherein the memory space corresponds to the amount of space required for the task;
   detecting memory defects in the memory space;
   removing a memory location corresponding to the memory defects from the memory space; and
   replacing the removed memory location with an error free memory space.

15. The method of claim 14, wherein analyzing a memory space requested by a task comprises:
   selecting a first address in the memory space;
   checking for memory defects in the first address; and
   offsetting the first address if a memory defect is detected.

16. The method of claim 15, wherein checking for memory defects in the first address comprises determining whether the first address is designated as defective in a faulty memory map.

17. The method of claim 16, further comprising updating the faulty memory map 20 when new memory defects are detected.

18. The method of claim 15, wherein offsetting the first address comprises skipping over a predetermined amount of memory.

19. The method of claim 14, wherein the Power-On Self Test memory allocation comprises allocating memory for one of a code, a static data or a stack.

20. A method for handling memory defects in Power-On Self Test phase comprising:
   determining an initial address to be used for Dual In-line Memory Module calibration;
   comparing a memory location corresponding to the initial address with a faulty memory map;
   offsetting the initial address if the memory location corresponding to the initial address includes a memory defect;
   analyzing a memory space requested by a Power-On Self Test task;
   detecting memory defects in the memory space;
   removing a memory location corresponding to the memory defects from the memory space; and
   replacing the removed memory location with an error free memory space.

\* \* \* \* \*